United States Patent [19]

Rijpkema et al.

[11] Patent Number: 4,608,006
[45] Date of Patent: Aug. 26, 1986

[54] TUNNEL CHEESE PRESS WITH REMOVABLE EXTERNAL PRESS CYLINDERS

[75] Inventors: Jan Rijpkema; Gustaaf A. Uittenbogaart, both of Sneek, Netherlands

[73] Assignee: Esmil Hubert B.V., Netherlands

[21] Appl. No.: 599,693

[22] Filed: Apr. 12, 1984

[30] Foreign Application Priority Data

Apr. 21, 1983 [NL] Netherlands ................ 8301401

[51] Int. Cl.⁴ .................................. B28B 5/00
[52] U.S. Cl. ........................ 425/347; 425/73; 425/85
[58] Field of Search ............ 425/DIG. 60, 338, 345, 425/346, 347, 348 R, 405 R, 99, 85, 434, 435, 412, 353, 352, 406 R, 75, 84, 73; 99/460; 100/193, 203, 221, 224; 198/744

[56] References Cited

U.S. PATENT DOCUMENTS

| | | | |
|---|---|---|---|
| 686,333 | 11/1901 | Prior | 264/DIG. 43 |
| 2,992,729 | 7/1961 | Curtius | 425/345 |
| 3,081,492 | 3/1963 | Grzegorczyk | 425/130 |
| 3,413,916 | 12/1968 | Friz et al. | 100/221 |
| 3,664,786 | 5/1972 | Devine | 425/99 |
| 3,763,769 | 10/1973 | Bysouth et al. | 100/37 |
| 3,786,911 | 1/1974 | Milazzo | 198/744 |
| 4,140,453 | 2/1979 | John, Jr. | 425/352 |
| 4,235,578 | 11/1980 | Cosmi | 425/261 |
| 4,314,630 | 2/1982 | Greenwood, Jr. | 198/744 |
| 4,408,975 | 10/1983 | Hack | 425/353 |

FOREIGN PATENT DOCUMENTS

| | | |
|---|---|---|
| 1287879 | 2/1962 | France . |
| 15982 | 12/1971 | New Zealand . |
| WO82/01976 | 6/1982 | PCT Int'l Appl. . |
| 2079711 | 1/1982 | United Kingdom . |

Primary Examiner—Jay H. Woo
Assistant Examiner—J. Fortenberry
Attorney, Agent, or Firm—Stevens, Davis, Miller & Mosher

[57] ABSTRACT

A cheese press, for pressing cheese in a plurality of cheese moulds having covers through which pressure is applied to the cheese, has a tunnel with walls defining roof, floor and sides and along which the spaced-apart cheese moulds are moved by conveyor means intermittently. Mounted on the tunnel are a plurality of pressing cylinders having pressing members actuated by the respective cylinders to press said mould covers downwardly. So that the cheese press is cheap to make and maintain, and easy to clean, the tunnel walls are smooth and have no internal or external reinforcing ribs, pressing cylinders are mounted spaced-apart on the tunnel roof outside the tunnel chamber and that each cylinder is releasable and removable from its pressing member without the need for access to the interior of the chamber.

2 Claims, 5 Drawing Figures

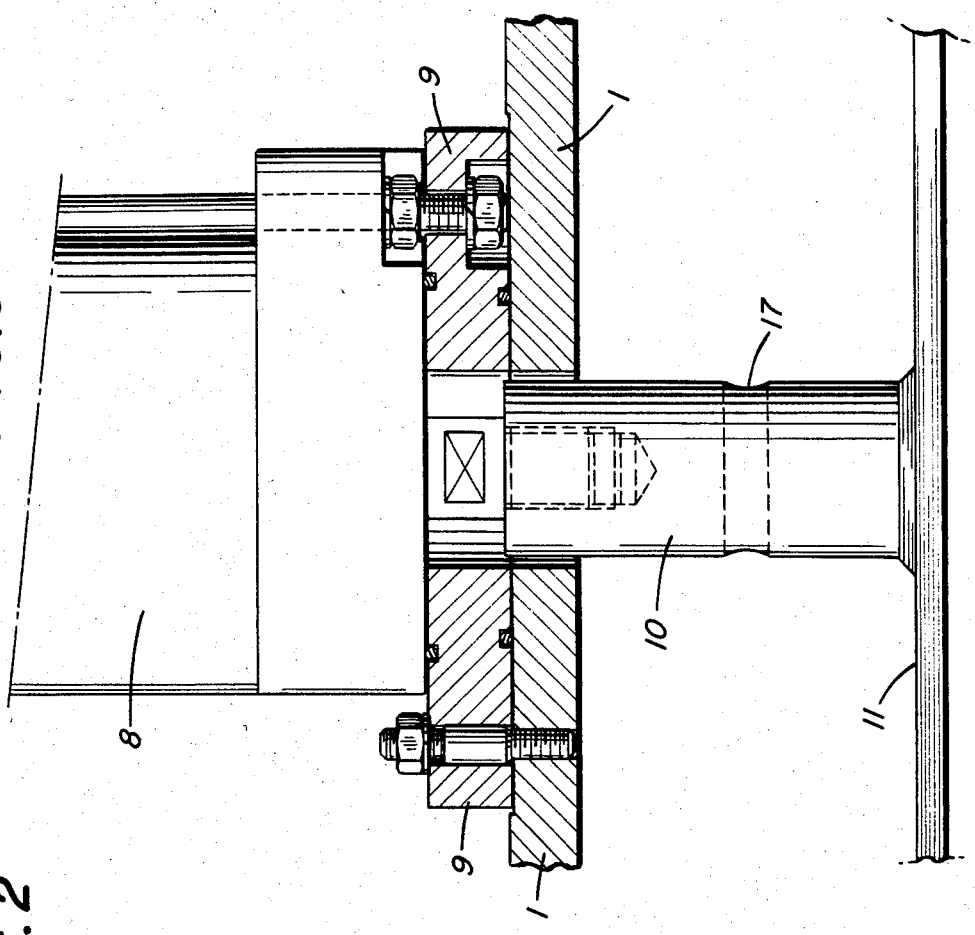
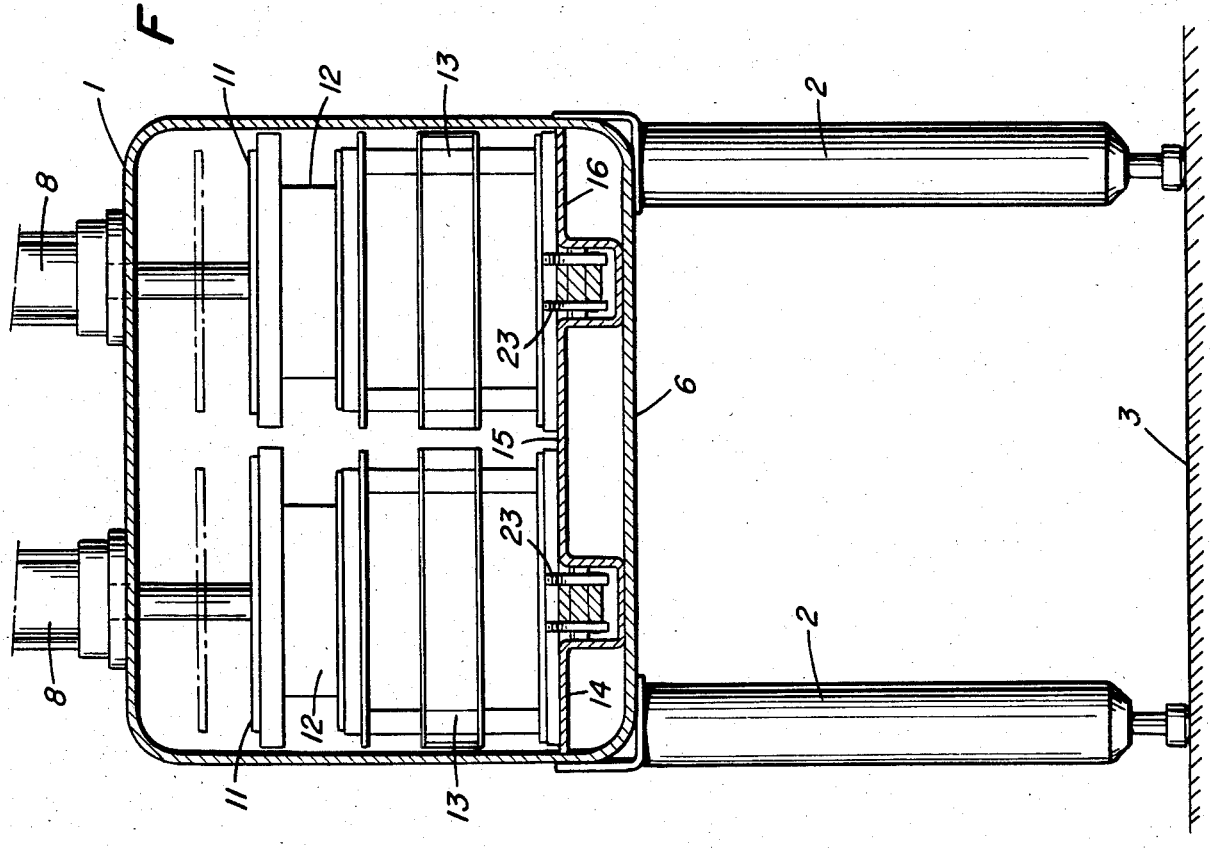

TUNNEL CHEESE PRESS WITH REMOVABLE EXTERNAL PRESS CYLINDERS

BACKGROUND OF THE INVENTION

1. Field of the Invention

The invention relates to a cheese press for pressing cheese in cheese moulds provided covers through which pressure is applied to the cheese.

2. Description of the Prior Art

A known cheese press adapted to press cheese in a plurality of moulds simultaneously has a tunnel chamber with a conveyor device for the intermittent horizontal displacement of the cheese moulds along the tunnel. When the cheese moulds are not being moved, for each cheese mould there is a press acting vertically, through a pressing member, on the cover of the cheese mould. Such presses are conveniently hydraulically or pneumatically powered.

For certain types of cheese, such as Cheddar cheese made from pieces, it is important to allow the air inclusions between the pieces to escape during pressing. This can be achieved by placing the cheese press in a vessel in which a vacuum is generated. However, there are difficulties in locating the hydraulic or pneumatic press cylinders of the cheese press in a vacuum vessel, for, in the event of a defect, the cylinders are difficult to reach, lubricating oil from the press cylinders may penetrate the vessel during pressure changes in the vessel, and extra care must be taken in keeping the inside of the vessel clean.

SUMMARY OF THE INVENTION

The object of the invention is to provide a cheese press of the tunnel type, which can be operated cleanly and safely, and which is inexpensive to manufacture and to maintain.

According to the invention, the tunnel of the cheese press is provided with smooth walls without internal or external reinforcement ribs, the press cylinders are located spaced apart on top of the tunnel outside the tunnel chamber and the pressing members can be released and removed from the cylinders from the outside, i.e. without the need for access to the interior of the tunnel chamber.

These measures have a number of advantages. Because of the volume of the tunnel chamber can be kept small, it can be brought under a vacuum more quickly, whereby the cheese press can be operated at lower operating costs. The press cylinders can be easily maintained, from the outside. The tunnel is self-supporting i.e. without reinforcing ribs, and is also smooth on the inside, which facilitates cleaning. The installation of the press cylinders outside the tunnel also contributes to cleanliness.

The conveyor means for the cheese moulds through the tunnel may be provided as a longitudinally reciprocatable member which is arranged along the tunnel chamber and carries cam elements e.g. pivoting levers, which, during the forward stroke of the member, displace the cheese moulds along the tunnel e.g. by a distance corresponding to a uniform spacing of the presses.

BRIEF INTRODUCTION OF THE DRAWINGS

A preferred embodiment of the invention will now be described by way of non-limitative example, with reference to the accompanying drawings, in which:

FIG. 2 is a transverse cross sectional view of the cheese press of FIG. 1.

FIG. 3 is a sectional view of the fastening of the press cylinders to the tunnel in the cheese press of FIG. 1.

DESCRIPTION OF THE PREFERRED EMBODIMENT

Figure 1:
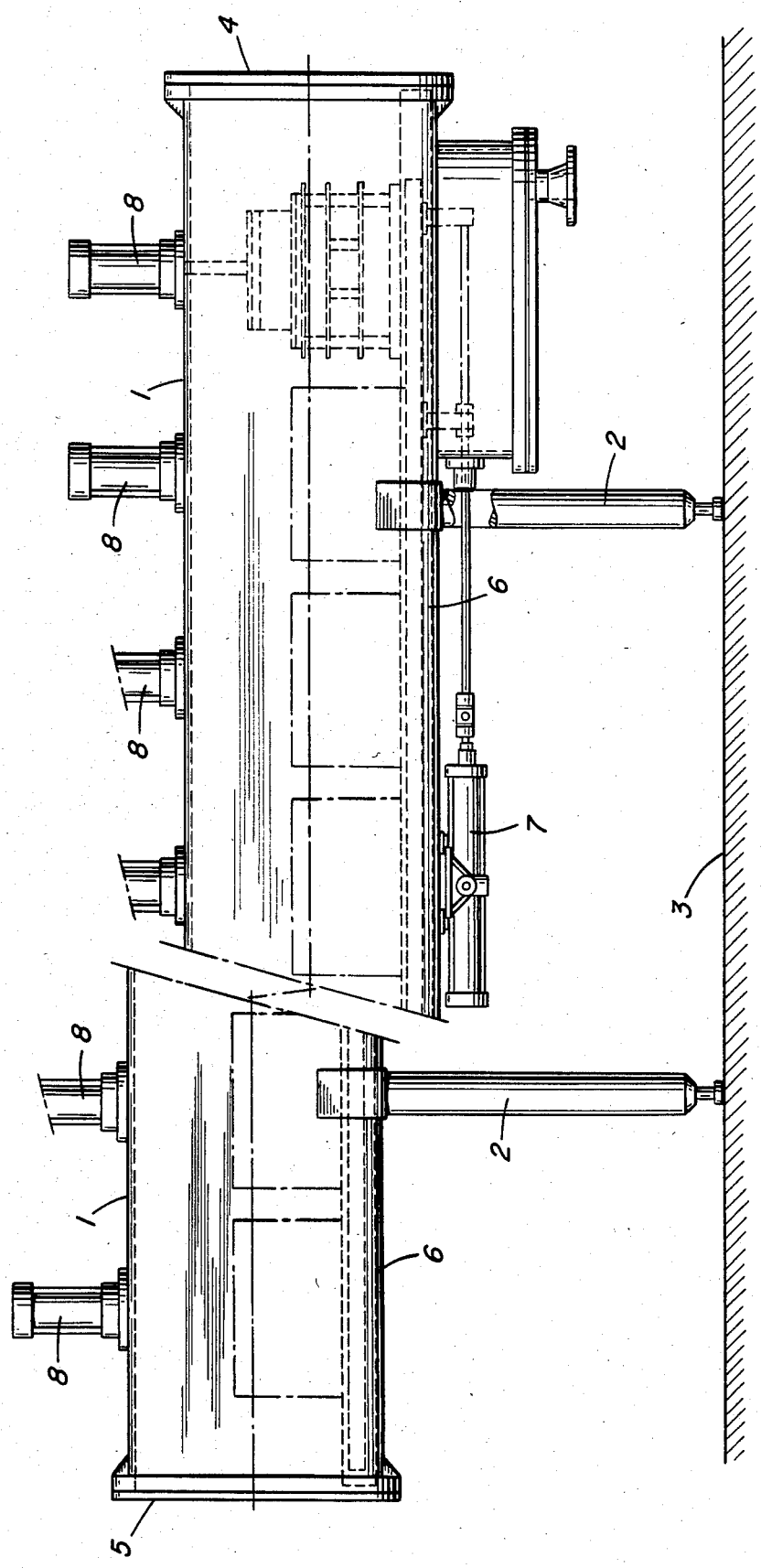
FIG. 1 is a side view of a cheese press embodying the invention.

The vacuum cheese press illustrated in FIG. 1 consists of a closed tunnel 1, which is supported on legs 2 on floor 3. Means for evacuating the tunnel chamber inside the tunnel 1 are conventional and are not shown. The tunnel 1 is closed at both ends by doors 4 and 5. The floor 6 of the tunnel 1 is inclined very slightly towards the door 4 at the outlet end, so that any liquid whey which reaches floor 6 is able to run down and be led away. A pneumatic or hydraulic cylinder 7 is mounted beneath the floor 6 to effect the reciprocating movement of a conveyor means in the tunnel, to be described.

FIG. 2 shows how the tunnel 1 in operation contains two parallel lines of cheese moulds 13, each mould having a cover 12 which is pressed down on the cheese in the mould by a hydraulic or pneumatic press cylinder 8 whose piston rod carries a pressing plate 11 contacing the cover 12. The press cylinders 8 are mounted outside the tunnel 1, on the roof thereof, the number of cylinders 8 totalling 72 (2×36) for a total tunnel length of 19 meters, the cylinders being spaced 0.5 m apart in each of the two rows.

FIG. 3 is a cross-section showing the fastening of one of the press cylinders 8 on the roof of the tunnel 1. The cylinder 8 (FIG. 3) is bolted onto a flange 9 which is itself bolted to the tunnel 1. The piston rod projecting from the cylinder has a screw-threaded connection to a rod 10 which supports the plate 11 at its lower end.

When exchanging a cylinder 8, the associated flange 9 is detached from the tunnel roof. The cylinder 8 is then pulled up with the plate 11 suspended on the rod 10, until a transverse bore 17 in the rod 10 is sufficiently far outside the tunnel wall that a pin (not shown) can be inserted in the bore 17, to hold the rod 10 and plate 11, whereafter the cylinder 8 can be detached by unscrewing the piston rod from the rod 10. Thus the exchange of a defective cylinder can be carried out very quickly, without the need for access to the interior of the tunnel 1.

On the base wall or floor 6 of the tunnel 1 a sheet member having three elevated portions 14,15 and 16 provides the support surfaces for the cheese moulds. Between the adjacent pairs of these elevated portions 14,15 and 15,16 is arranged the conveyor means for the cheese moulds in the form of a respective rods 22 which carry opposed pairs of cams in the form of pivoting levers whose construction will be discussed with reference to FIG. 5. The conveyor rods 22 extend longitudinally along the tunnel and are moved reciprocatingly by the cylinder 7.

Figure 4:
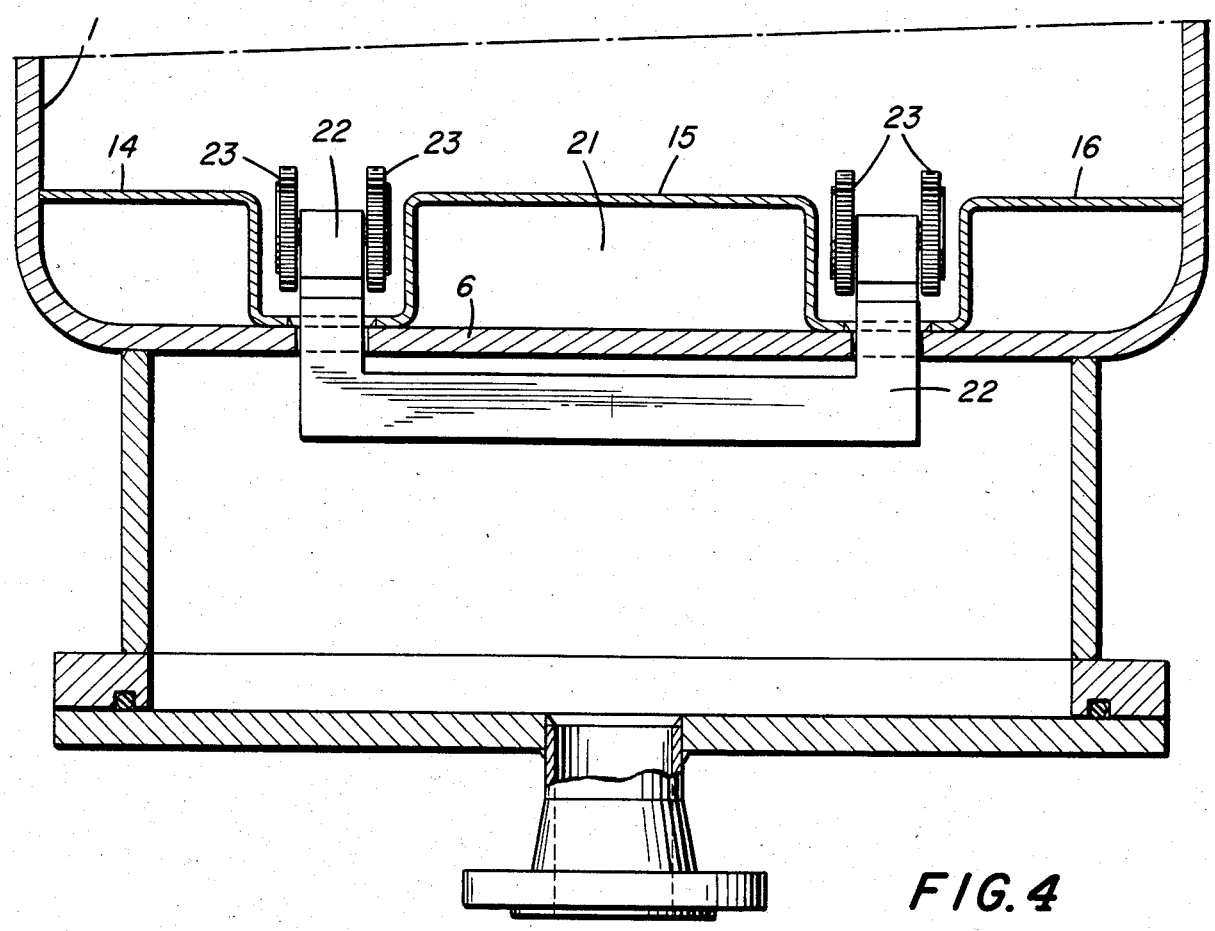
FIG. 4 is a detail of the whey receptacle of the cheese press of FIG. 1.

An opening is provided in the floor 6 close to the discharge door 4 of the tunnel 1, for collecting leaking and split moisture e.g. whey, in the receptacle 21 (see FIG. 4) attached beneath the tunnel.

Figure 5:
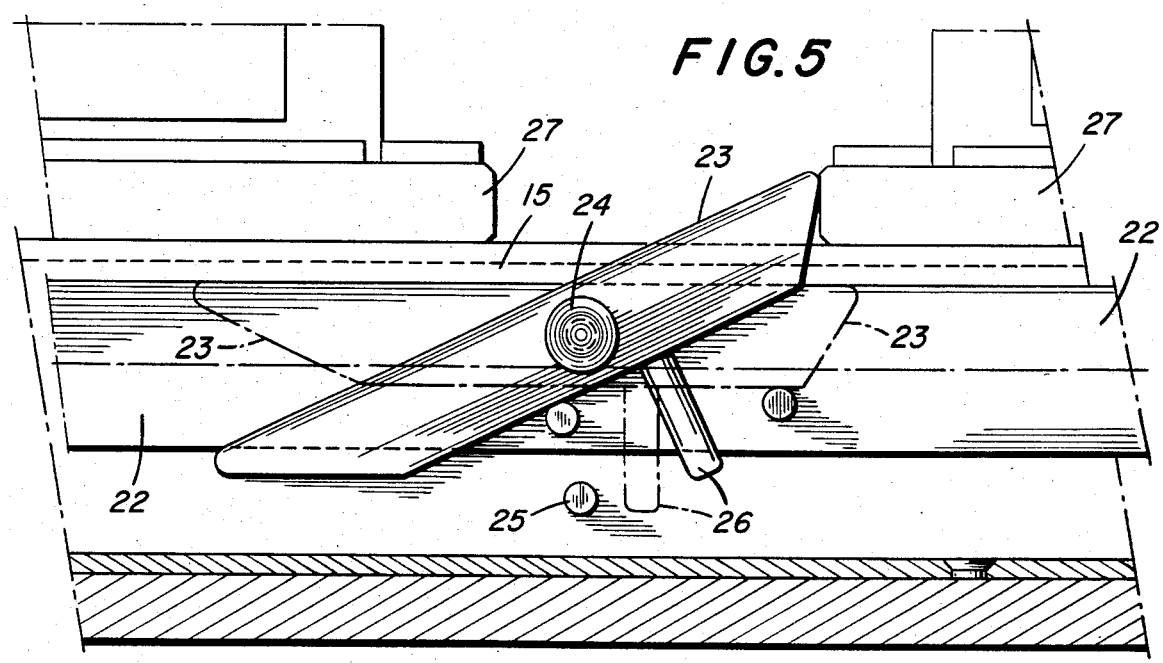
FIG. 5 is a detail of the conveyor means of the cheese press of FIG. 1.

FIG. 5 shows one of the horizontal reciprocating rods 22 which carries pairs of levers 23 at intervals of 0.5 m. The levers 23 can pivot freely relative to the rod 22 about a horizontal axis 24. The axis 24 is located on the lever 23 so that the lever is normally in the tilted position shown by full lines in FIG. 5, with its upper end in the path of movement of the cheese moulds. Thus on the forward stroke of the reciprocating rod 22, the lever 23 engages a cheese mould (27 in FIG. 5) and moves it forward along the tunnel 1 by a distance of 0.5 m to the next press 8,11. On the return stroke of the rod 22 the levers 23 pivot to pass under the cheese moulds. To force the levers to return to the tilted position, fixed stops 25 are installed on the floor 6 of the tunnel 1, and each lever 23 carries at the underside projections 26 which, on the return stroke of the rod 22, engages one of the stops 26 to ensure that the lever 23 does indeed tilt and is ready to displace the next cheese mould 27 along the tunnel 1.

The conveyor means 22 is operated intermittently by the cylinder 7 (FIG. 1), for filling and emptying the tunnel chamber of cheese moulds, after retraction of the pressing plates 11 from the moulds.

The tunnel chamber of the cheese press has minimal cross-sectional dimensions because, as FIG. 2 shows, it holds no more than the two cheese moulds 13, the conveyor means 22 for the moulds underneath them, and the plates 11 suspended above them. Consequently the tunnel may be designed to be self-supporting and has smooth wall surfaces, so that there are no internal and external reinforcing ribs or other structural members which makes cleaning easier and improves cleanliness in cheese making. In fact, as shown, the corners of the tunnel 1 are rounded, so that inaccessible regions are avoided.

What is claimed is:

1. Cheese press for pressing cheese in a plurality of cheese moulds having movable covers through which pressure is applied to the cheese, the press comprising
   (a) a tunnel having bounding walls providing roof, floor and sides of the tunnel defining a tunnel chamber, the bounding walls being smooth and having no internal or external reinforcing ribs, and the tunnel chamber having a mould support surface adapted to receive the cheese moulds spaced apart thereon,
   (b) conveyor means for moving the cheese moulds, spaced apart from each other, intermittently over said support surface longitudinally along the tunnel chamber,
   (c) a plurality of presses arranged spaced apart longitudinally along the tunnel, each press comprising an actuating cylinder mounted on the roof of the tunnel outside the tunnel chamber and a pressing member arranged inside the tunnel chamber and actuated by said cylinder so as to engage and press down the cover of a said cheese mould located temporarily beneath the press, said actuating cylinder having a circumferentially threaded rod axially extending therefrom and an annular flange removably attached to said actuating cylinder and said roof and circumscribing said threaded rod, said pressing member having an axially extending shaft extending therefrom, said shaft having an internally threaded cavity into which said rod extending from said actuating cylinder is screwed, said shaft extending from said pressing member having a transverse hole therethrough between said pressing member and said internally threaded cavity, said hole being placed below the interior of the roof a distance greater than the thickness of the roof when the actuating cylinder and said pressing member are assembled.

2. Cheese press according to claim 1 wherein said conveyor means comprises a longitudinally extending, longitudinally reciprocatable member carrying a plurality of cam elements arranged to project into the path of movement of the cheese moulds so as to engage and move them over the support surface on the forward stroke of said reciprocatable member.

* * * * *